United States Patent [19]
Takanashi et al.

[11] Patent Number: 5,299,042
[45] Date of Patent: Mar. 29, 1994

[54] LIGHT-TO-LIGHT CONVERSION METHOD, DISPLAY UNIT USING THE SAME, AND LIGHT-TO-LIGHT CONVERSION ELEMENT INCORPORATED THEREIN

[75] Inventors: Itsuo Takanashi, Kamakura; Shintaro Nakagaki, Miura; Ichiro Negishi; Tetsuji Suzuki, both of Yokosuka; Fujiko Tatsumi, Yokohama; Ryusaku Takahashi, Yokosuka, all of Japan

[73] Assignee: Victor Company of Japan, Ltd., Yokohama, Japan

[21] Appl. No.: 707,813

[22] Filed: May 30, 1991

[30] Foreign Application Priority Data

May 30, 1990 [JP] Japan .................................. 2-140533
May 30, 1990 [JP] Japan .................................. 2-140534

[51] Int. Cl.$^5$ ........................ G02F 1/01; G02F 1/133; H04N 3/14
[52] U.S. Cl. ........................ 359/72; 359/57; 359/138; 348/195; 348/795
[58] Field of Search ............ 359/57, 58, 72, 138, 359/89; 358/63, 206, 226

[56] References Cited

U.S. PATENT DOCUMENTS

| | | |
|---|---|---|
| 4,818,867 | 4/1989 | Hayashi et al. ........................ 359/58 |
| 4,959,722 | 9/1990 | Takanashi et al. .................... 358/211 |
| 5,031,047 | 7/1991 | Takanashi et al. .................... 358/213.11 |
| 5,051,571 | 9/1991 | Braun et al. ........................ 250/201.9 |
| 5,054,892 | 10/1991 | Takanashi et al. .................... 359/72 |
| 5,064,275 | 11/1991 | Tsunada et al. ...................... 359/72 |
| 5,124,545 | 6/1992 | Takanashi et al. .................... 250/213 R |

*Primary Examiner*—Nelson Moskowitz
*Attorney, Agent, or Firm*—Pollock, Vande Sande & Priddy

[57] ABSTRACT

A display unit which can be used with various sources of information includes a light-to-light conversion element composed of first and second stripe electrodes arranged to jointly form a matrix electrode, and a photoconductive layer and a light modulation layer disposed between the first and second stripe electrodes, the impedance of the photoconductive layer changes with information written to the light-to-light conversion element. The photoconductive layer is irradiated with a linear light beam deflected in a direction to intersect first stripe electrode, while at the same time successive pieces of information to be inputted to corresponding picture elements are supplied to respective stripe electrode elements of the first stripe electrode. With the use of the matrix electrode, information can be written to and read out from the light-to-light conversion element at a higher response rate with high resolution.

9 Claims, 10 Drawing Sheets

TIME SEQUENTIAL INFORMATION SIGNALS

LIGHT-TO-LIGHT CONVERSION METHOD, DISPLAY UNIT USING THE SAME, AND LIGHT-TO-LIGHT CONVERSION ELEMENT INCORPORATED THEREIN

BACKGROUND OF THE INVENTION

1. Field of the Invention

The present invention relates to a light-to-light conversion method for use in display units, optical computers, etc. and a display unit using such light-to-light conversion method. It is also concerned with a light-to-light conversion element incorporated in the display unit.

2. Description of the Related Art

Various display units are known in which a light beam modulated in its intensity in accordance with time sequential information signals is projected onto a screen via projection optical system, thereby providing a two-dimensional display of an image on the screen.

The prior display units are, however, only applicable with a particular image source. For instance, cathode ray tubes are unable to reproduce those sources other than video signals. Similarly, moving picture projectors can only reproduce movie films. In addition, electro-cinematographic systems are used With a particular information recording medium.

An improved display unit is proposed by the present assignee as described in the co-pending U.S. patent application Ser. No. 633,223, filed Dec. 24, 1990, entitled "Method of Information Conversion and Apparatus thereof".

The proposed display unit is generally satisfactory. However, it still has drawbacks. For example, the response rate of a linear modulator element is relatively low and that an additional image-forming optical system is needed to two-dimensionally project a modulated linear beam onto the input side of a light-to-light conversion element.

SUMMARY OF THE INVENTION

With the foregoing drawbacks in view, it is an object of the present invention to provide a light-to-light conversion method, a display unit using the conversion method, and a light-to-light conversion element incorporated in the display unit, which can be used with various information sources such as time sequential information signals and information recording media (a charge holding medium, a movie film, etc.), and are capable of writing and reading information at high speeds and with high resolution.

A first aspect of this invention provides a light-to-light conversion method which comprises the steps of: providing a light-to-light conversion element including at least a photoconductive layer and a light modulation layer disposed between two electrodes, at least one of the two electrodes being a stripe electrode composed of a number of parallel separate stripe electrode members; irradiating the photoconductive layer with electromagnetic radiation having a linear cross-sectional shape while deflecting the electromagnetic radiation in a direction to intersect the stripe electrode members; and supplying the respective stripe electrode members of the stripe electrode with successive pieces of information to be inputted to corresponding picture elements.

According to a second aspect of this invention, there is provided a display unit which comprises: a light-to-light conversion element including at least a photoconductive layer and a light modulation layer disposed between two electrodes, at least one of the two electrodes being a stripe electrode composed of a number of parallel separate stripe electrode members; and means for modulating a readout beam in accordance with information written to the light-to-light conversion element. Both of the electrodes may be stripe electrodes having a number of parallel separate stripe electrode members, the stripe electrode members of one of the two stripe electrodes being perpendicular to the stripe electrode members of the other of the stripe electrodes. The information may be given in the form of a beam of electromagnetic radiation produced by conversion from an image of charges stored in a charge storage means into an optical image, or in the form of a beam of electromagnetic radiation read out from a recording medium having at least a light modulation layer. In addition, the information may be given in the form of a beam of electromagnetic radiation read out from an optical information recording medium.

A third aspect of this invention provides a light-to-light conversion element which comprises: a first stripe electrode and a second stripe electrode formed on corresponding ones of a pair of substrates so as to jointly form a matrix electrode; and a photoconductive layer and a light modulation layer disposed between the first and second stripe electrodes, the photoconductive layer having an electric property which changes in accordance with information written to the light-to-light conversion element.

The above and other objects, features and advantage of the present invention will become more apparent from the following description when making reference to the detailed description and the accompanying sheets of drawings in which preferred structural embodiments incorporating the principles of the present invention are shown by way of illustrative example.

DETAILED DESCRIPTION OF THE PREFERRED EMBODIMENTS

Figure 1:
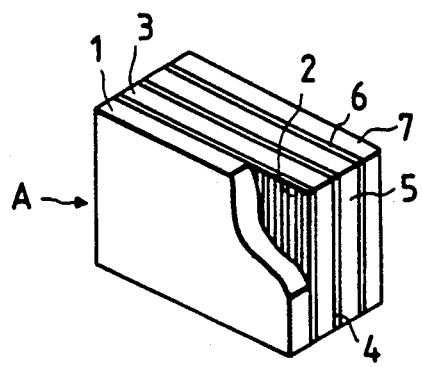
FIG. 1 is a diagrammatical perspective view, with parts cutaway for clarity, of a light-to-light conversion element according to the present invention.

The present invention will be described in greater detail with reference to certain preferred embodiments shown in the accompanying drawings in which like reference characters designate like or corresponding parts throughout the several views.

FIG. 1 shows a light-to-light conversion element A which forms a main portion of the present invention. The light-to-light conversion element A is composed of a first substrate 1, a stripe electrode 2, a photoconductive layer 3, a dielectric mirror 4, a light modulation layer 5, a transparent electrode 6 and a second substrate 7 that are laminated together in the order named. As described above, the light-to-light conversion element A includes at least the photoconductive layer 3 and the light modulation layer 5 disposed between the two electrodes 2, 6. At least one of the electrodes 2, 6 is split into a number of parallel narrow stripe electrode members extending vertically. The dielectric mirror 4 ma be omitted when the light-to-light conversion element is of the transmitting type.

Figure 2A:
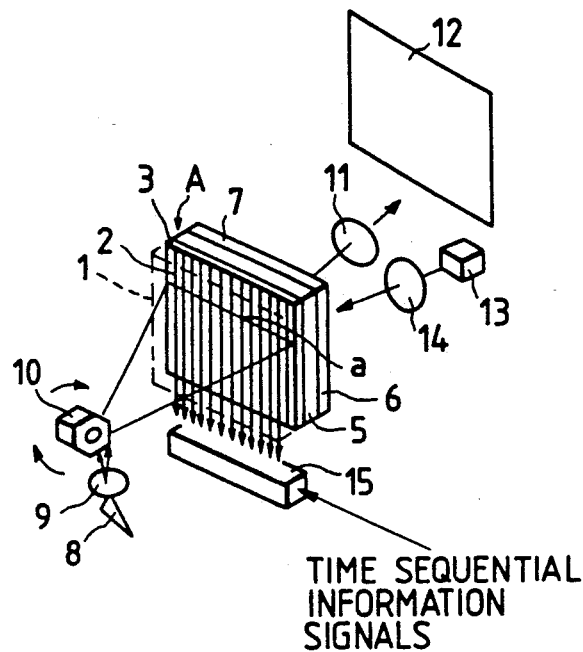
FIG. 2A is a diagrammatical perspective view showing the construction and operation of a display unit according to one embodiment of this invention.

FIGS. 2A through 2E are illustrative of the construction and operation of a display unit incorporating the light-to-light conversion element A shown in FIG. 1. As shown in FIG. 2A, the display unit includes a light source 8 for emitting a linear beam of light, a lens 9 for projecting the linear light beam onto a rotating polygon mirror 10 constituting a vertical deflector for deflecting the incident light beam in a vertical direction, a projection lens 11 for projecting the output beam coming from the light-to-light conversion element A onto a screen 12, a light source 13 for emitting a readout light beam onto the output side of the light-to-light conversion element A through a lens 14, and a serial-parallel converter 15 connected to each of the stripe electrode members of the stripe electrode 2.

In the operation of the display unit of the foregoing construction, a linear light beam emitted from the light source 8 is projected onto the vertical deflector 10 which in turn deflects the linear light beam in a vertical direction. Since the linear light beam extends perpendicularly across the stripe electrode members and since the deflector 10 composed of a rotating polygon mirror is rotating as stated above, the linear light beam a is scanned vertically over the stripe electrode 2 (namely, in the longitudinal direction of the stripe electrode members of the stripe electrode 2).

Time sequential signals containing image information to be written to the light-to-light conversion element A are supplied to the stripe electrode members of the stripe electrode 2. In this instance, the time sequential image information signals are converted into parallel simultaneous signals by means of the serial-parallel converter 15 before they are supplied to the corresponding strip electrode members. Thus, the individual stripe electrode members are supplied with a corresponding set of simultaneous pieces or items of information. The linear light beam which is irradiated over the stripe electrode 2 perpendicularly across the respective stripe electrode members serves to give an address on a horizontal line. Thus, the simultaneous pieces of information supplied to the corresponding stripe electrode members are recorded on the photoconductive layer 3.

Figure 2B:
FIGS. 2B through 2E are views explanatory of various forms of input beams and corresponding output display images.
Figure 2C:
Figure 2D:
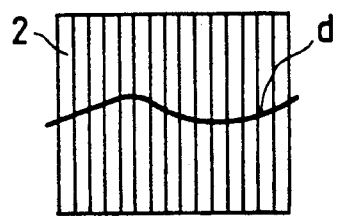
Figure 2D:
Figure 2D:
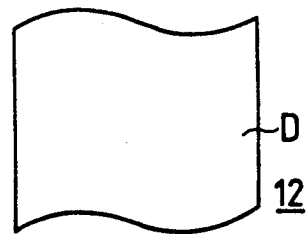
Figure 2E:
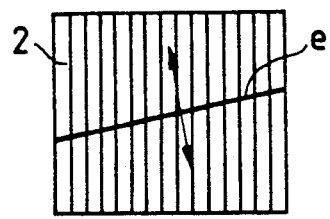
Figure 2E:
Figure 2E:
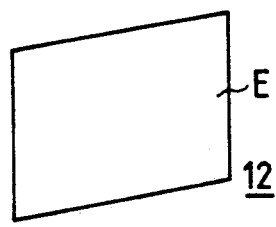

The light beam irradiated over the stripe electrode 2 perpendicularly across the stripe electrode members has a linear cross section as indicated by a in FIG. 2A. However, even when the stripe electrode 2 is irradiated with a light beam having a non-linear cross-sectional shape as shown in FIG. 2B at b or in FIG. 2C at c, the address on the horizontal line can be given. It is therefore possible to project a distorted image D on the screen 12 by irradiating the stripe electrode 2 with a light beam d of non-linear in cross section. In addition, the direction of deflection of the light beam may be changed such that a light beam e having a linear cross-sectional shape passes obliquely across the stripe electrode members of the stripe electrode 2. In this instance, a distorted image E such as shown in FIG. 2E is projected on the screen 12.

When the image information written to the light-to-light conversion element A is to be read out, the light source 13 projects readout light through the lens 11 onto the light modulation layer 5 of the light-to-light conversion element A. A readout beam containing the readout image information is reflected back from the light-to-light conversion element A and then projected onto the screen 12 via the projection lens 11.

Figure 3:
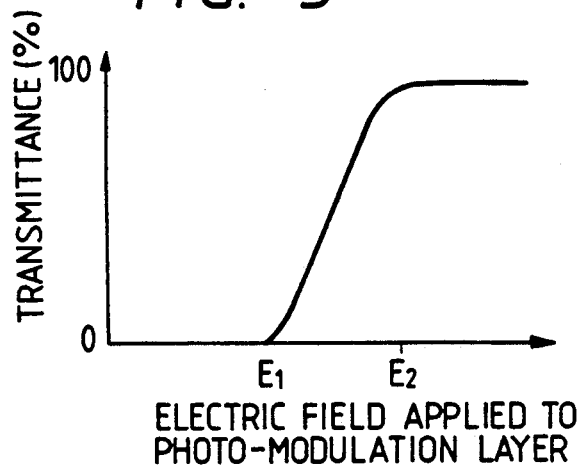
FIG. 3 is a graphical representation of the correlation between the transmittance and the applied electric field.

FIG. 3 shows the transmittance-to-applied electric field characteristic curve of the light-to-light conversion element. It is known that in the case of a light modulation layer 5 composed of a high polymer-liquid crystal composite film, the transmittance of this light modulation layer 5 is 100% (i.e., the readout light coming from the outside is transmitted through the light modulation layer 5) when the voltage applied across the two electrodes 2 and 6 to exert an electric field on the photo-conductive layer 5 reaches to a threshold level $E_2$. Eligible materials for the light modulation layer 5 include an electro-optical crystal, PLZT (Lead Lanthanum Zirconate Titanate), etc.

Figure 4:
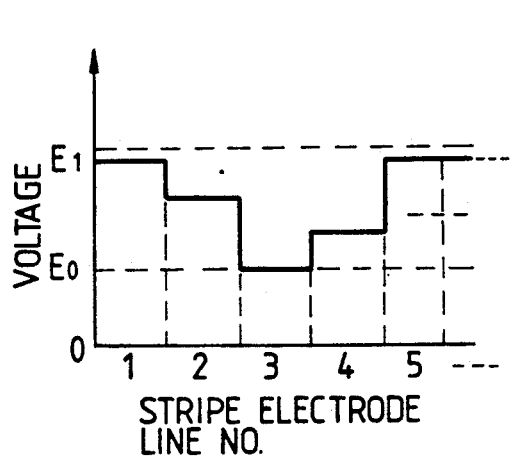
FIGS. 4 and 5 are graphs illustrative of the change of voltage applied to a photoconductive layer of the light-to-light conversion element.
Figure 5:
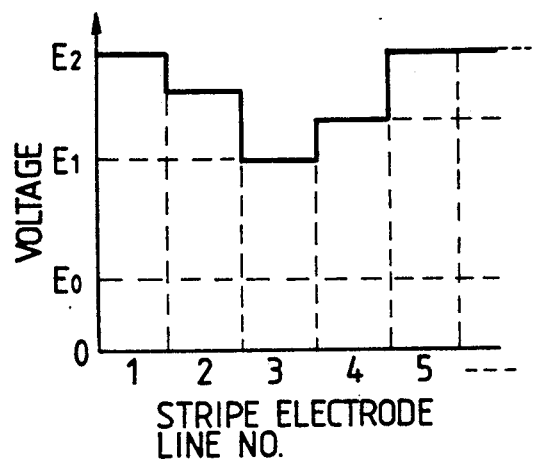

As shown in FIG. 4, voltage values applied to the corresponding stripe electrode members (indicated by the line numbers allotted thereto) of the stripe electrode 2 in accordance with the time sequential information signals are all below the threshold voltage $E_2$, so that the readout light beam is not modulated when such information signals are applied. When the stripe electrode 2 is scanned with the light beam, the scanning light beam changes the impedance of the photoconductive layer 3. With this impedance change, the voltage applied to the light modulation layer 5 via the electrode 6 is altered by $|E_1 - E_0|$, so that the voltage values applied across the stripe electrode members in accordance with the corresponding information signals all exceed the threshold voltage $E_2$. Consequently, the transmittance of the light modulation layer 5 rapidly increases to a level at which the readout light coming from the external light source 18 is transmitted through the light modulation layer 5. Thus, the information signals are optically modulated by the readout light.

As a result, by controlling the operation of the vertical deflector 10 to deflect the linear light beam in synchronism with the time sequential signals applied to the stripe electrode 2, a two-dimensional image information can be written to the light-to-light conversion element A, as shown in FIG. 2A. Even when the transmittance-to-applied electric field characteristic curve shown in FIG. 3 is not obtained, the potential at the intersection between the linear light beam and each stripe electrode member of the stripe electrode 2 is strongly drawn, so that an image in response to the information signals can be written to the light-to-light conversion element A.

In the display unit shown in FIG. 2A, the outside surface of the transparent electrode 6 of the light-to-light conversion element A can be used as a display panel when directly observed by the viewer. Alternatively, an image which is optically read out from the light-to-light conversion element A in accordance with the information signals can be displayed on the screen 12, as shown in FIG. 2A.

Figure 6:
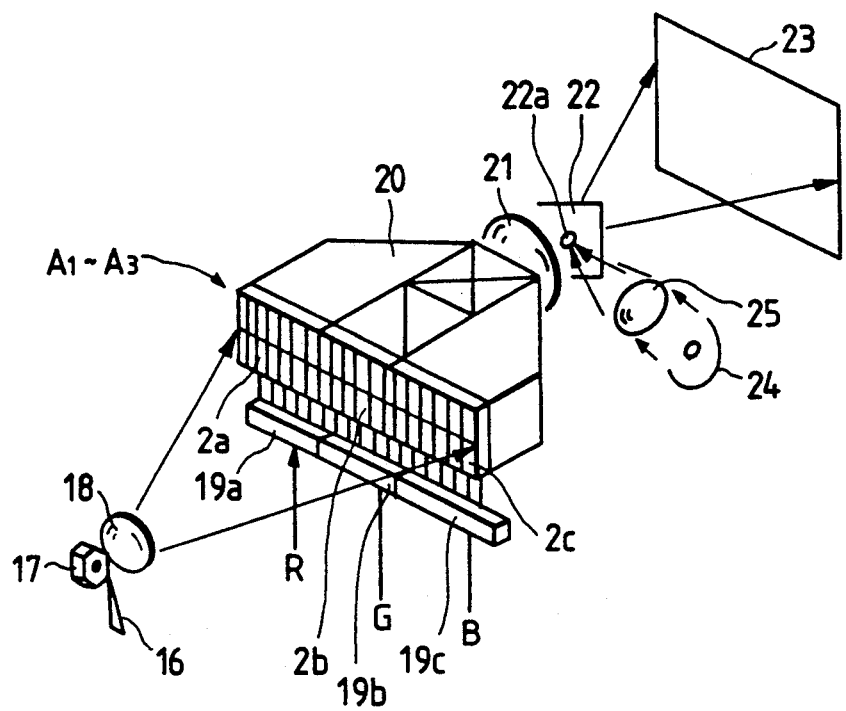
FIG. 6 is a diagrammatical perspective view showing a display unit constructed to display a color image according to a second embodiment of this invention.

FIG. 6 shows a display unit according to a second embodiment of the invention which is constructed to deal with a color image. The display unit includes a first light source 16 for emitting a linear light beam, an optical deflector 17 in the form of a rotating polygon mirror for deflecting the linear light beam in the vertical direction, a lens 18 for projecting the deflecting light beam onto three horizontally juxtaposed light-to-light conversion elements $A_1 - A_3$, three serial-parallel converters 19a, 19b, 19c to which R signals, G signals and B signals are supplied, respectively, stripe electrodes 2a, 2b, 2c of the respective light-to-light conversion elements $A_1, A_2, A_3$ corresponding to a color separation pattern of three primary colors (i.e., red (R), green (G) and blue (B)), a three color composite prism 20, a projection lens 21 disposed behind the prism 20, a mirror 22 disposed between the projection lens 21 and a screen 23 and having a pinhole 22a, a second light source 24 for reading light, and a lens 25 for projecting the reading light onto the mirror 22.

The stripe electrodes 2a, 2b, 2c correspond to three separate colors R, G, B, respectively, and each having a number of vertical stripe electrode members. The R, G and B signals (information signals) corresponding to the color separation pattern are inputted to the corresponding electrodes 2a, 2b, 2c via the respective serial-parallel converters 19a, 19b, 19c. Items of color information written to the corresponding light-to-light conversion elements $A_1$, $A_2$, $A_3$ are modulated by readout light coming from the light source 24 via the mirror 22 and the lens 21 and thereafter projected on screen 23 via the lens 21 and the pinhole 22a in the mirror 22.

Figure 7:
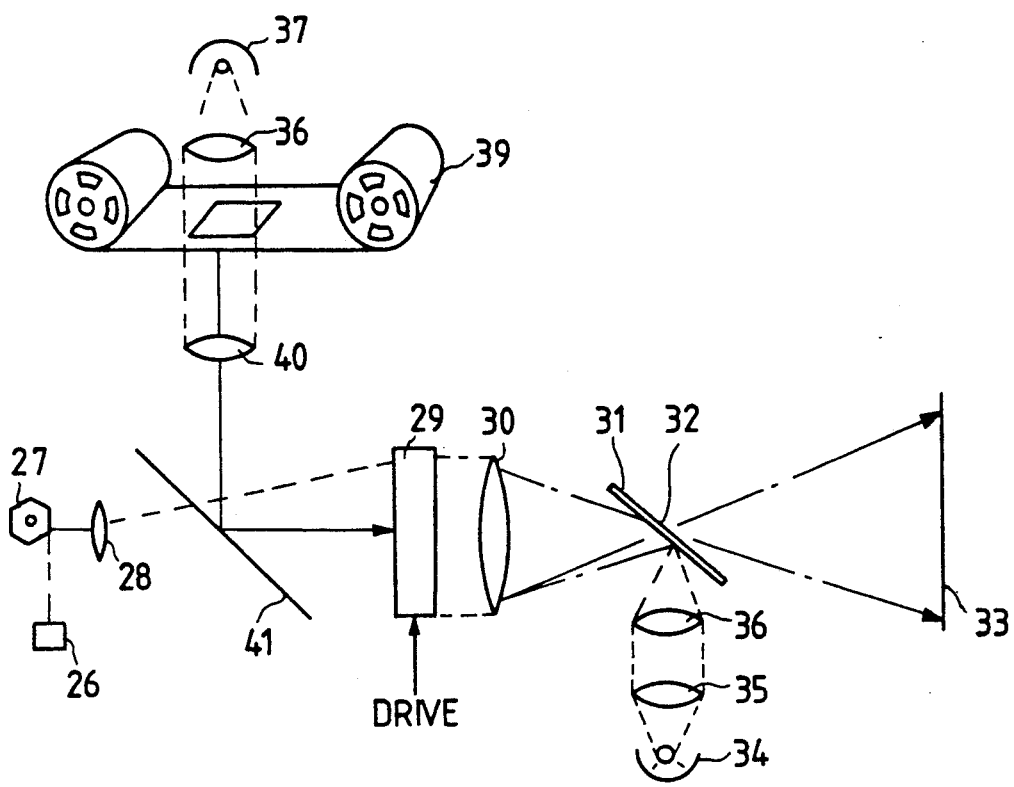
FIG. 7 is a diagrammatical, partly perspective view showing a display unit constructed to use with an optical information recording medium according to a third embodiment of this invention.

FIG. 7 shows a display unit according to a third embodiment of this invention which is constructed to use with an optical information recording medium. In this figure, reference characters 26, 34, 37 denote light sources, 27 a vertical deflector, 28, 30, 35, 36, 38 and 40 lenses, 29 a light-to-light conversion element, 31, 41 mirrors, 32 a pinhole in the mirror 31, 33 a screen, and 39 an information recording medium.

With this construction, the light source 37 projects readout light onto the information recording medium 39 via the lens 38 to readout a beam corresponding to an optical information recorded on the information recording medium 39. The readout beam is projected by the lens 40 onto the mirror 41 which in turn reflects the readout beam toward the light-to-light conversion element 29, thereby writing the reflected beam directly to the light-to-light conversion element 29. A beam of light coming from the light source 26 is used as it is written to the light-to-light conversion element 29. The optical information written to the light-to-light conversion element 29 is read out when readout light coming from the light source 34 is projected into the light-to-light conversion element 29 via the lenses 35, 36, the mirror 31, and the lens 30. Then, an output beam corresponding to the recorded optical information is outputted from the light-to-light conversion element 29 and then projected onto the screen 33 via the lens 30 and the pinhole 32.

Figure 8A:
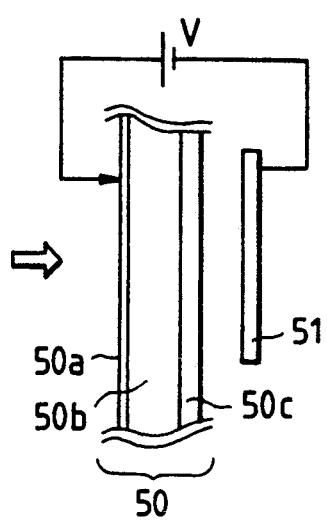
FIGS. 8A and 8B are diagrammatical views showing charge storage type recording media as they are being recorded.
Figure 8B:
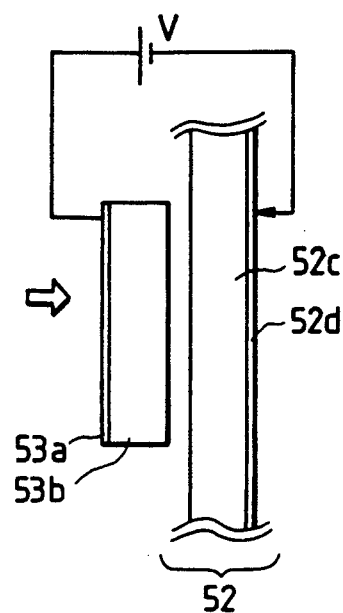
Figure 9A:
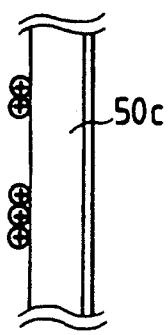
FIGS. 9A and 9B are diagrammatical views showing the charge storage type recording media shown in FIGS. 8A and 8B, respectively, with their charge storage layers written with information.
Figure 9B:
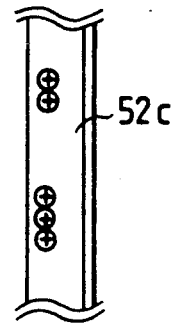

Typical examples of the information recording medium include charge storage type recording media as shown in FIGS. 8A and 8B. The recording medium 50 shown in FIG. 8A includes an electrode 50a. a photoconductive layer 50b and a charge storage layer 50c. A predetermined voltage is applied across the electrode 50a and an opposite electrode 51 to write pieces of information in the form of a pattern of charges on the surface of the charge storage layer 50c, as shown in FIG. 9A. The recording medium shown in FIG. 8B is composed of a charge storage layer 52c and an electrode 52d. A predetermined voltage is applied across the electrode 52d and an electrode 53a including a photoconductive layer 53b so as to write information to the recording medium 52 in the form of a pattern of charges stored in the charge storage layer 52c, as shown in FIG. 8B. The recording medium shown in FIGS. 8B and 9B is of the embedded type in which the charges are stored in the charge storage layer 52c in response to the written information.

Figure 10:
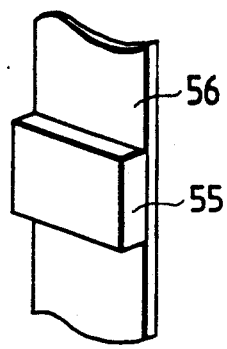
FIG. 10 is a schematic perspective view of a charge storage type recording medium as it is in the reproducing operation.

When the information recorded on the charge storage type recording medium is to be reproduced, a reproducing head 55 is used to scan the recording medium 56, as shown in FIG. 10. The reproducing head 55 reads out the recorded information from the charge storage layer and creates a corresponding electric field of charges in a light modulation layer.

Figure 11A:
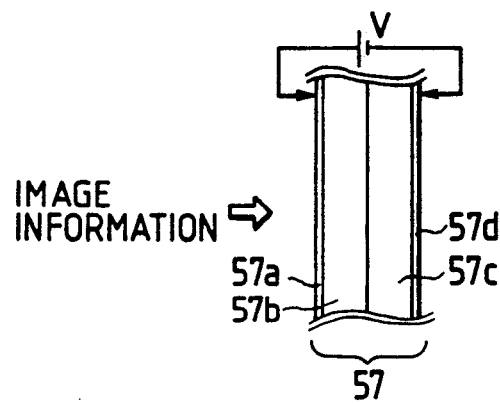
FIGS. 11A, 11B and 11C are diagrammatical views showing the recording operation of different recording media each having a light modulation layer.
Figure 11B:
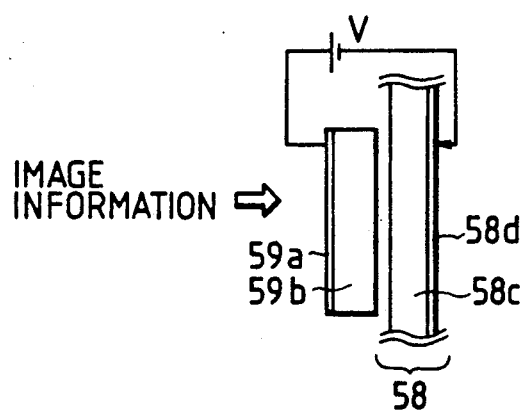
Figure 11C:
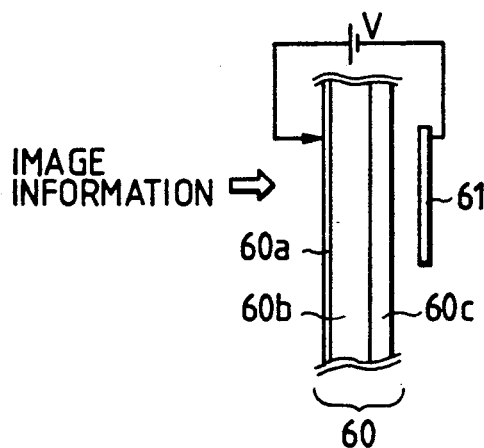

FIGS. 11A through 11C show typical examples of a recording medium having at least a light modulation layer. The recording medium 57 shown in FIG. 11A is composed of a first electrode 57a, a photoconductive layer 57b, a light modulation layer 57c and a second electrode 57d. A predetermined voltage V is applied across the electrodes 57a, 57d. The recording medium 58 illustrated in FIG. 11B includes a light modulation layer 58c and an electrode 58d. A predetermined voltage is applied across the electrode 58d and an electrode 59a, the electrode 59a having a photoconductive layer 59b. The recording medium 60 shown in FIG. 11C is composed of a first electrode 60a, a photoconductive layer 60b and light modulation layer 60c. A predetermined voltage V is applied across the electrode 60a and an opposite electrode 61.

The light modulation layers 57c, 58c, 60c may be made from a high polymer-liquid crystal composite film, PLZT, etc. The light modulation layers 57c, 58c, 60c may be laminated with a charge storage layer to form a light modulation member devoid of a memory effect.

In the recording media 57, 58, 60, information written to the photoconductive layer 57b, 59b, 60b is in the form of a beam of electromagnetic radiation which is produced by reading out the recording medium 57, 58, 60 including at least a light modulation layer 57c, 58c, 60c.

Figure 12A:
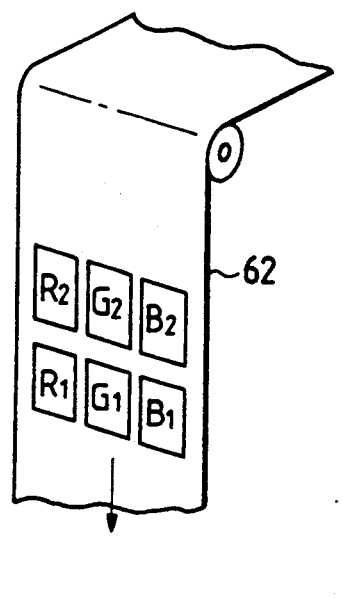
FIGS. 12A and 12B are diagrammatical perspective views showing color separation type optical information recording media having different patterns of separation of three primary color signals.
Figure 12B:
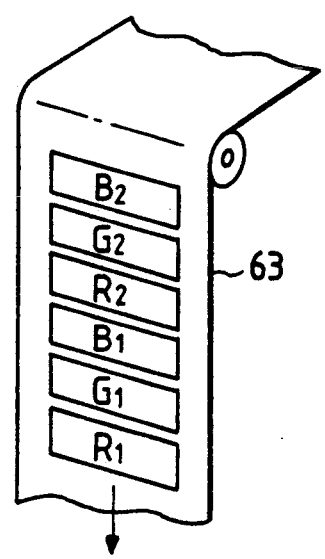

FIGS. 12A and 12B show typical examples of a color separation type information recording medium. The color separation type information recording medium 62 shown in FIG. 12A contains three rows of pieces of color information of light in the red, green and blue wavelengths, respectively, On the other hand, the information recording medium 63 shown in FIG. 12B contains a single row of groups of color information, each group including successive three pieces of color information of light in the red, green and blue wavelengths.

Figure 13:
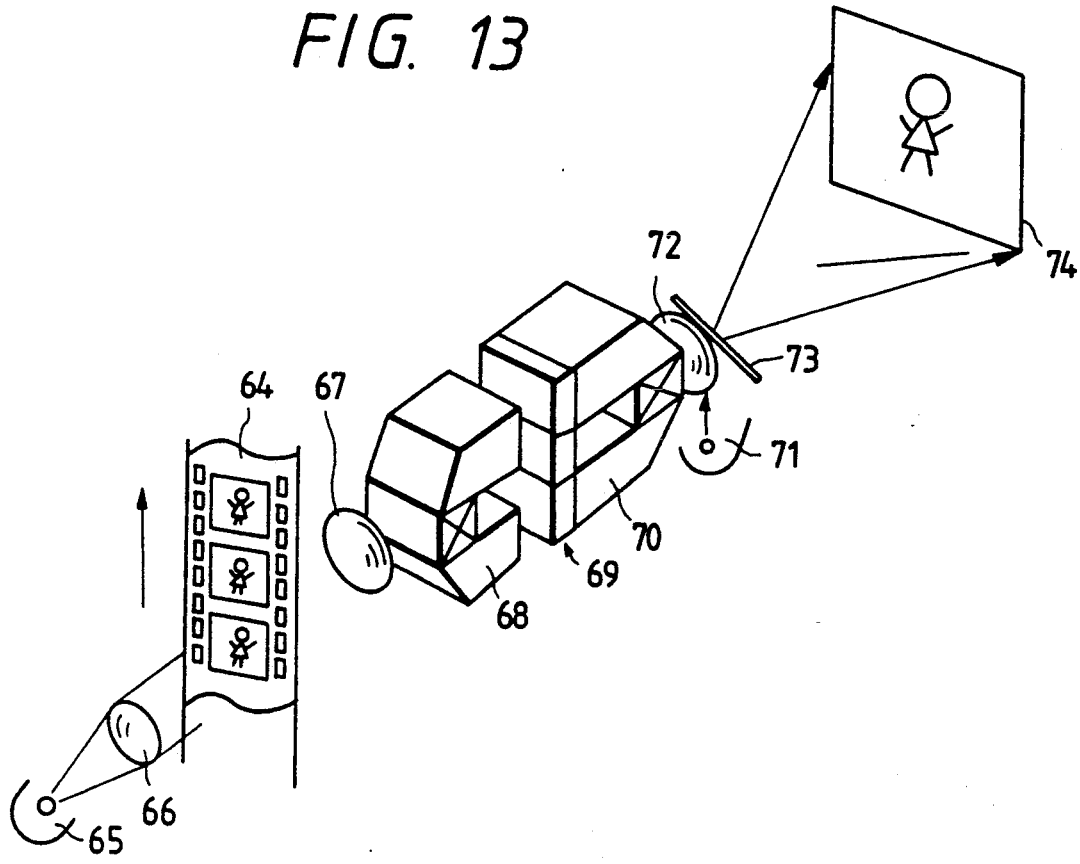
FIG. 13 is a diagrammatical perspective view showing a display unit used with the optical information recording medium shown in FIG. 12B.

FIG. 13 illustrates a display unit constructed to read out and display information contained in the optical information recording medium such as shown in FIG. 12B. In FIG. 13, reference character 64 denotes an optical information recording medium such as a color film containing information of recorded in color. The display unit includes two light source 65, 71, three lenses 66, 67, 72, a three color separation system 68, a light-to-light conversion element 69, a three color composite system 70, a mirror 73 and a screen 74.

With this construction, the optical information recorded on the optical information recording medium 64 is read out by a beam of light coming from the light source 65 via the lens 66. An output beam containing the readout optical information is separated by the three color separation system 68 (composed of a three color separation prism) into red (R), green (G) and blue (B) color signals which are in turn written to the light-to-light conversion element 69. Subsequently, the color signals are read out from the light-to-light conversion element 69 and projected on the screen 74 via the three color composite system 70 (composed of three color composite prism) when readout light coming from the light source 71 is inputted to the light-to-light conversion element 69.

Figure 14:
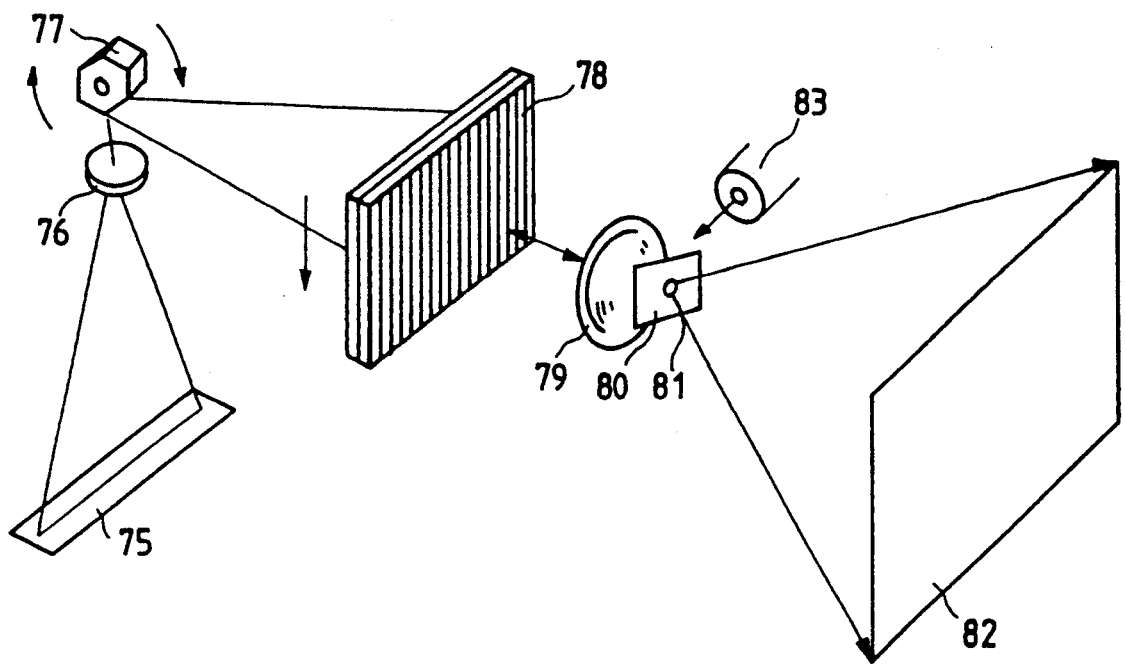
FIG. 14 is a diagrammatical perspective view showing a display unit incorporating a stripe type light-to-light conversion element according to a fourth embodiment of this invention.

FIG. 14 shows a display unit according to a fourth embodiment of this invention. The display unit includes a linear light source 75, a condenser lens 76, a polygon mirror 77, a stripe type light-to-light conversion element (striped spatial light modulation element) 78, a projection lens 79, a mirror 80 having a pinhole 81, a screen 82 and a light source 83 for readout light.

The light-to-light conversion element 78 has two stripe electrodes constructed to deal with a color separation pattern as described below in greater detail. A linear beam of light coming from the linear light source 75 is deflected by the rotating polygon mirror 77 in a vertical scanning direction indicated by the arrow in FIG. 14, thus irradiating stripe electrode members of each stripe electrode with the deflected light beam.

Figure 15:
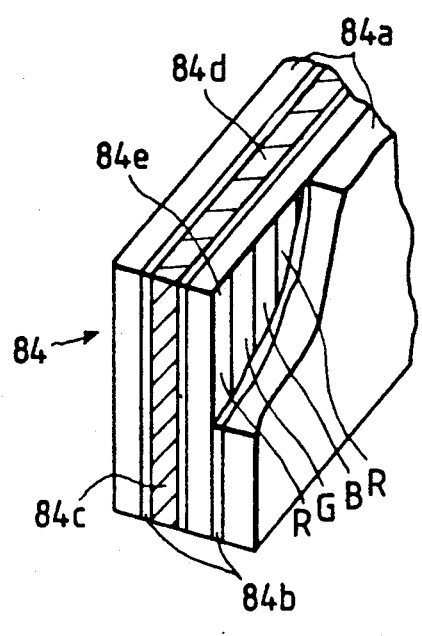
FIGS. 15 and 16 are fragmentary perspective views, with parts cutaway for clarity, of stripe type light-to-light conversion elements according to the present invention.
Figure 16:
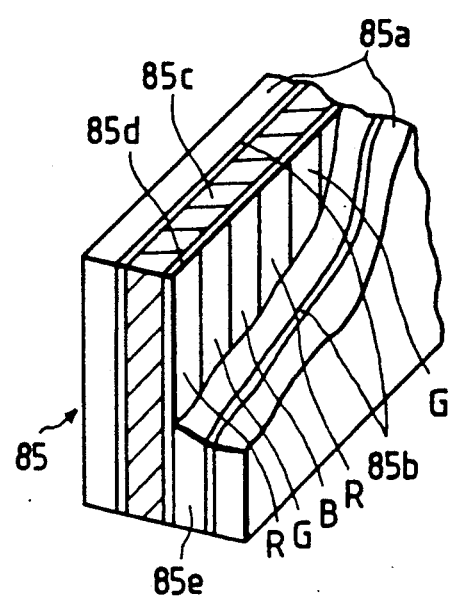

FIGS. 15 and 16 show two different examples of the stripe type light-to-light conversion element (stripe type spatial light modulation element). The light-to-light conversion element 84 shown in FIG. 15 includes two glass substrates 84a, 84a, two transparent electrodes 84b, 84b, a photoconductive layer 84c, a dielectric mirror 84d, and a color separation filter 84e having a color separation characteristic. The light-to-light conversion element shown in FIG. 16 includes two glass substrates 85a, 85a, two transparent electrodes 85b, 85b, a photoconductive layer 85c, a dielectric mirror 85d having a color separation characteristic, and a light modulation layer 85e.

Figure 17:
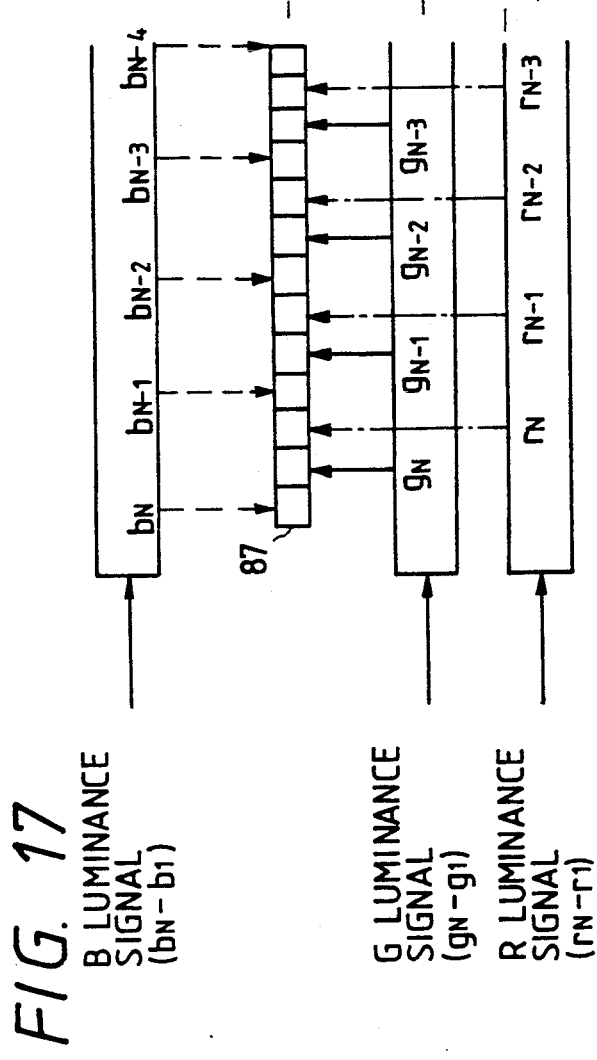
FIGS. 17 and 18 are diagrammatical views explanatory of the manner in which optical information signals are supplied to each of the foregoing stripe type light-to-light conversion elements.
Figure 18:
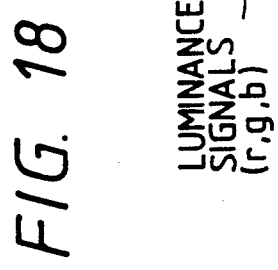

Time sequential signals corresponding to optical information are supplied to the stripe type light-to-light conversion element (spatial light modulation element) 84, 85 described above in such a manner that three sets of luminance signals $b_1$-$b_n$, $g_1$-$g_n$, $r_1$-$r_n$ are supplied to a stripe electrode 87 via corresponding ones of three serial-parallel converters/light-emitting element drivers 86a, 86b, 86c, as shown in FIG. 17. Alternatively, they may be supplied to a light-emitting element array 88 via a single serial-parallel converter/light-emitting element driver 89 in the form of a row of successive groups of luminance signals $r_1$, $g_1$, $b_1$-$r_n$, $g_n$, $b_n$, as shown in FIG. 18.

Figure 19:
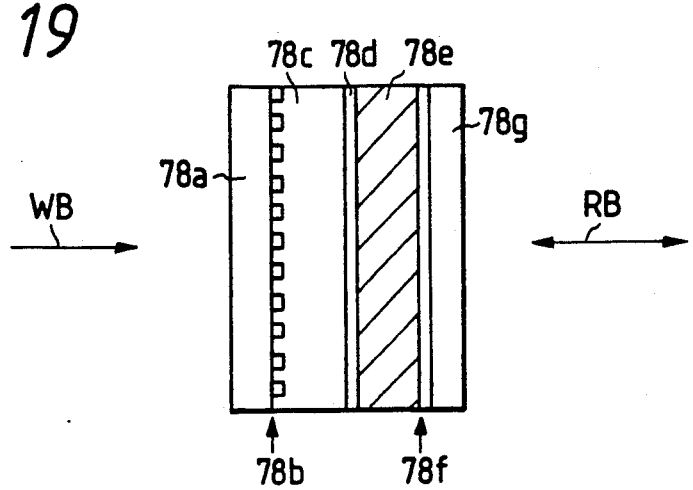
FIG. 19 is a diagrammatical side view of the light-to-light conversion element shown in FIG. 14.
Figure 20:
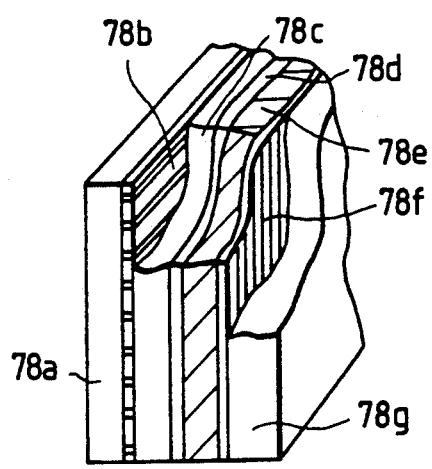
FIG. 20 is a perspective view, with parts cutaway for clarity, of the light-to-light conversion element of FIG. 19.

The light-to-light conversion element 78 shown in FIG. 14 has a construction shown in FIGS. 19 and 20. As shown in FIGS. 19 and 20, the light-to-light conversion element 78 includes a first transparent substrate 78a, a first stripe electrode 78b (X electrode) formed on the substrate 1, a photoconductive layer 78c laminated with the stripe electrode 78b, a dielectric mirror 78d laminated with the photoconductive layer 78c, a light modulation layer 78e laminated with the dielectric mirror 78d, a second stripe electrode 78f (Y electrode) laminated between the light modulation layer 78e and a second transparent substrate 78g. The photoconductive layer 78c is made from a-Si, CdS, $Bi_{12}SiO_{20}$, PVk, etc. The dielectric mirror 78d is formed of a multilayered film of $SiO_2$, $TiO_2$, etc, The light modulation layer 78e is made from an electro-optical material such as LiNbO$_3$, a liquid crystal including a twisted nematic type liquid crystal, a scattering type liquid crystal such as a high polymer dispersion liquid crystal, and a ferroelectric liquid crystal, pLZT, etc.

The X electrode 78b is transparent against the wavelength of an electromagnetic radiation beam WB to be written to the light-to-light conversion element 78 via the transparent substrate 78a. Similarly, the Y electrode 78f is transparent against the wavelength region of a readout beam RB. Each of the X and Y electrodes 78b, 78f is composed of a number of parallel separate stripe electrode members and the stripe electrode members of the X electrode 78b are perpendicular to the stripe electrode members of the Y electrode 78f, with the photoconductive layer 78c, the dielectric mirror 78d and the light modulation layer 78e disposed between the X and Y electrodes. The dielectric mirror 78d may be omitted when the light-to-light conversion element 78 is of the transmitting type.

In order to form a matrix electrode B described later, the light-to-light conversion element 78 includes at least the first and second stripe electrodes (X and Y electrodes) 78b and 78f formed respectively on the first and second transparent substrates 78a, 78g, and the photoconductive layer 78c and the light modulation layer 78e disposed between the first and second stripe electrodes 78b, 78f. With this construction, the impedance (electric property) of the photoconductive layer 78c changes in accordance with electromagnetic radiation beams or electric signals (information) composed of time sequential signals electric response that are written to the photoconductive layer 78c via the substrate 78a or the X and Y electrodes 78b, 78f.

Figure 21:
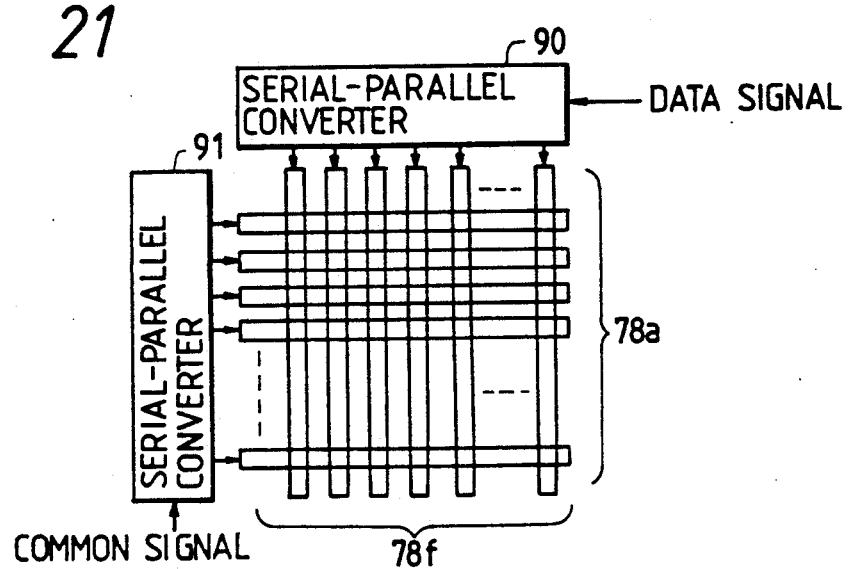
FIG. 21 is a diagrammatical view showing a matrix electrode composed of X and Y electrodes of the stripe type light-to-light conversion element of FIG. 19.

FIG. 21 shows the general construction of the matrix electrode B formed jointly by the X electrode 78b and the Y electrode 78f. The matrix electrode B is connected with first and second serial-parallel converters 90, 91. When a time sequence of serial data signals are supplied, the first serial-parallel converter go converts serial data signals into a set of corresponding simultaneous parallel data signals and supplies them to the respective stripe electrode members of the Y electrode 78f. To the second serial-parallel converter 91, a common signal is supplied.

The matrix electrode B, as in the case of the so-called simple matrix type liquid crystal display, changes the potential applied across the X and Y electrodes in response to the data signals and the common signal, thereby writing to the photoconductive layer 78c information corresponding to the data signals. The data signals are based on video signals of the NTSC (National Television System Committee) system. In this instance, the information can be written from the matrix electrode B instead of writing an electromagnetic radiation beam to the photoconductive layer 78c via the substrate 78a. When information is written from the matrix electrode B to the photoconductive layer 78c, the voltage of the matrix electrode B changed so that the electric field in the light modulation layer 78e is altered correspondingly, thereby modulating a readout beam. The readout beam modulated by the written information is read out from the light-to-light conversion element 78.

In the illustrated embodiment, the serial-parallel converters 90, 91 are supplied with series data signals and a common signal, respectively. It is possible to arrange these converters 90, 91 such that the series data signals are supplied to the serial-parallel converter 91, while the common signal is supplied to the serial-parallel converter 90.

Figure 22:
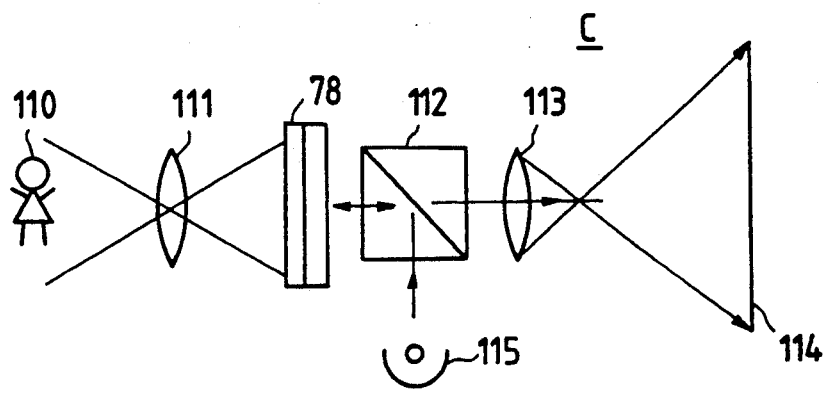
FIG. 22 is a diagrammatical view illustrative of the manner in which an optical image is writing to and reading from a display unit incorporating the light-to-light conversion element shown in FIG. 19.

FIG. 22 shows a display unit C incorporating a light-to-light conversion element 78 of the construction shown in FIGS. 19 and 20. The display unit C further includes a lens 111, a beam splitter 112, a projection lens 113, a screen 114 and a readout light source 115. Designated by 110 is an object to be displayed on the screen 114.

When an optical image corresponding to the object 110 is written to and read out from the light-to-light conversion element 78, a drive voltage is applied across the X and Y electrodes 78b and 78f (FIGS. 19 and 20) while the respective stripe electrode members are kept at a same potential level. The drive voltage thus applied changes the impedance of the photoconductive layer 78c in accordance with an optical image written to the light-to-light conversion element 78 via the lens 111 by means of an electromagnetic radiation beam. With this change of impedance, an electric field corresponding to the optical image thus formed is applied to the light modulation layer 78e. A readout beam coming from the light source 115 via the beam splitter 112 is modulated by the light modulation layer 78e. The modulated readout light is reflected back from the light-to-light conversion element 78 and then projected onto the screen 114 via the beam splitter 112 and the lens 113, whereby forming an image projected on the screen 114.

As appears clear from the foregoing description, the light-to-light conversion element 78 can be used with various sources of information such as a beam of electromagnetic radiation written via the lens 111, electric information signals applied to the matrix electrode B composed of the X and Y stripe electrodes 78b, 78f or a combination of the electromagnetic radiation beam and the electric information signals.

Figure 23:
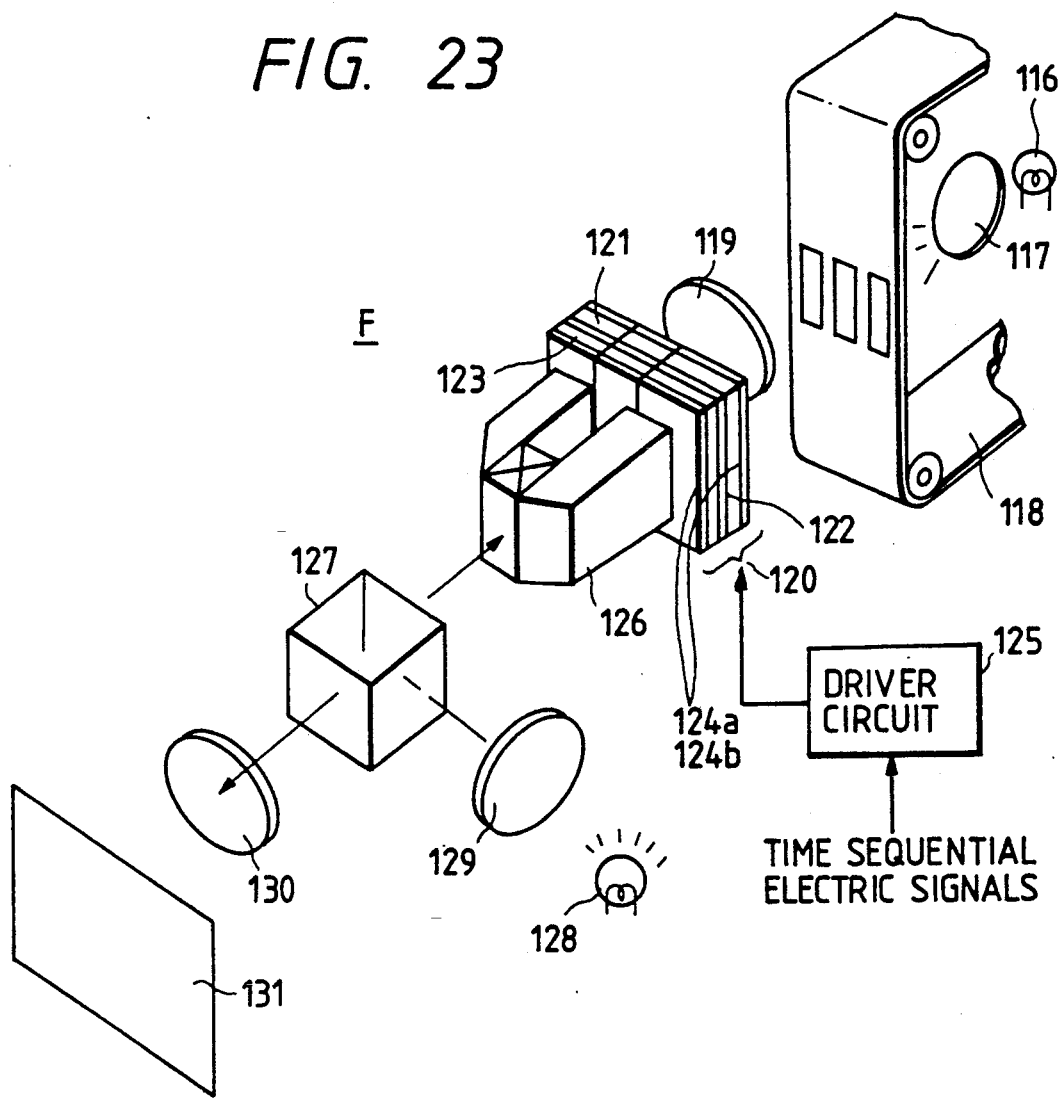
FIG. 23 is a diagrammatical perspective view of a display unit constructed to display a color image according to another embodiment of this invention.

FIG. 23 shows a display unit F according to another embodiment of this invention which is constructed to deal with a color image recorded on a recording medium 118. The display unit F includes a reproducing light source 116, a projection lens 117 associated with the light source 116, a condenser lens 19, three laterally juxtaposed stripe type light-to-light conversion elements 120 each responsive to light in one of the red (R), green (G) and blue (B) wavelengths, a driver circuit 125 for driving a matrix electrode of each conversion element 120 composed of X and Y electrodes 124a, 124b, a three color composite system 126 composed of a three color composite prism, a beam splitter 127, a projection light source 128, a lens 129, a projection lens 130, and a screen 31. The light-to-light conversion elements 120 are structurally the same as the light-to-light conversion element 78 shown in FIGS. 19 and 20 and each include a photoconductive layer 121, a dielectric mirror 122 and a light modulation layer 123 disposed between the X and Y stripe electrodes 124a, 124b.

The display unit F of the foregoing construction is able to perform a display operation only when time sequential signals corresponding to color video signals are supplied to the driver circuit 125 to drive the matrix electrodes of the respective light-to-light conversion elements 120. In addition, the display unit F is also operative to display information which is written into the stripe type light-to-light conversion elements 120 in the form of an electromagnetic radiation beam optically read out from the recording medium 118.

Pieces of color information written to the respective light-to-light conversion elements 120 in a desired color separation pattern of three primary colors R, G, B are outputted to the three color composition system 126 by modulating a readout beam coming from the projection light source 128. The pieces of information of separate colors are combined by the three color composition system 126 and then projected onto the screen 131 via the beam splitter 127 and the projection lens 130.

As described above, the light-to-light conversion element having a matrix electrode enables writing and reading operations at a higher response rate with an improved degree of resolution as compared to the conventional light-to-light conversion elements. In particular, the light-to-light conversion element of this invention is able to be used not only with information contained in electromagnetic radiation beams but also with information contained in time sequential signals. The present invention is also useful when embodied in a light-to-light conversion means for optical computers.

Obviously, various minor changes and modifications of the present invention are possible in the light of the above teaching. It is therefore to be understood that within the scope of the appended claims the invention may be practiced otherwise than as specifically described.

What is claimed is:

1. A display unit, comprising:

a light-to-light conversion element including at least a photoconductive layer and a light modulation layer that are disposed between two transparent electrodes, each of said two transparent electrodes being formed on one transparent substrate, at least one of said two transparent electrodes being a stripe electrode composed of a number of parallel separate stripe electrode members;

means for irradiating said photoconductive layer with an electromagnetic radiation beam having a linear cross-sectional shape while deflecting the electromagnetic radiation beam in a vertical direction to intersect said stripe electrode members, said linear cross-sectional shape of the electromagnetic radiation beam having a length which is capable of intersecting all of said stripe electrode members simultaneously;

means for modulating a readout beam in accordance with information written to said light-to-light conversion element; and means for displaying said readout beam after said readout beam is modulated by said modulating means;

wherein in one mode, the respective stripe electrode members of said stripe electrode are supplied with time sequential signals containing image information to be inputted to corresponding picture elements in the form of a corresponding set of simultaneous pieces of information, and wherein in one another mode, while the respective stripe electrode members of said stripe electrode are kept at a same potential level, the electromagnetic radiation beam while being deflected in the vertical direction is irradiated by said irradiating means over said photo conductive layer after it is modulated with image information.

2. A display unit according to claim 1, wherein said two transparent electrodes are stripe electrodes having a number of parallel separate stripe electrode members, said stripe electrode members of one of said two stripe electrode being perpendicular to the stripe electrode members of the other of said stripe electrodes.

3. A display unit according to claim 1, wherein said light-to-light conversion element further includes a color separation filter disposed between said light modulation layer and the other one of said two transparent electrodes.

4. A display unit according to claim 1, wherein said light-to-light conversion element further includes a dielectric mirror having a color separation characteristic and disposed between said photoconductive layer and said light modulation layer.

5. A display unit according to claim 1, wherein said information is in the form of a beam of electromagnetic radiation produced by conversion from an image of charges stored in a charge storage means into an optical image.

6. A display unit according to claim 1, wherein said information is in the form of a beam of electromagnetic radiation read out from a recording medium having at least a light modulation layer.

7. A display unit according to claim 1, wherein said information is in the form of a beam of electromagnetic radiation read out from an optical information recording medium.

8. A light-to-light conversion element, comprising:

a first stripe electrode and a second stripe electrode formed on corresponding ones of a pair of transparent substrates so as to jointly form a matrix electrode, each of said first and second stripe electrodes including a number of parallel separate stripe electrode members, said stripe electrode members of said first stripe electrode extending perpendicular to the stripe electrode members of said second stripe electrode;

a photoconductive layer and a light modulation layer that are disposed between said first and second stripe electrodes; and said photoconductive layer having an electric property which changes in accordance with electromagnetic radiation beams written to said photoconductive layer via said transparent substrates or electric signals composed of time sequential signals written to said photoconductive layer via said first and second stripe electrodes.

9. A light-to-light conversion element according to claim 8, further including a dielectric mirror disposed between said photoconductive layer and said light modulation layer.

* * * * *

UNITED STATES PATENT AND TRADEMARK OFFICE
CERTIFICATE OF CORRECTION

PATENT NO. : 5,299,042
DATED : March 29, 1994
INVENTOR(S) : Itsuo Takanashi et al.

It is certified that error appears in the above-indentified patent and that said Letters Patent is hereby corrected as shown below:

On the title page, item
 [75] Inventors:, after "Ryusaku Takahashi," insert
--Keiichi Maeno, both of--.

Signed and Sealed this

Eighteenth Day of October, 1994

Attest:

BRUCE LEHMAN

*Attesting Officer*  *Commissioner of Patents and Trademarks*